(12) United States Patent
Tagami

(10) Patent No.: US 11,355,151 B2
(45) Date of Patent: Jun. 7, 2022

(54) MAGNETIC DISK DEVICE CAPABLE OF CORRECTING SERVO DEMODULATION POSITION

(71) Applicants: Kabushiki Kaisha Toshiba, Tokyo (JP); Toshiba Electronic Devices & Storage Corporation, Tokyo (JP)

(72) Inventor: Naoki Tagami, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/364,465

(22) Filed: Jun. 30, 2021

(65) Prior Publication Data
US 2021/0327469 A1 Oct. 21, 2021

Related U.S. Application Data

(62) Division of application No. 16/569,334, filed on Sep. 12, 2019, now Pat. No. 11,087,796.

(30) Foreign Application Priority Data

Mar. 8, 2019 (JP) .............................. JP2019-042706

(51) Int. Cl.
*G11B 20/10* (2006.01)
*G11B 5/012* (2006.01)
*G11B 20/12* (2006.01)

(52) U.S. Cl.
CPC ........ *G11B 20/10268* (2013.01); *G11B 5/012* (2013.01); *G11B 20/10277* (2013.01); *G11B 20/10287* (2013.01); *G11B 20/12* (2013.01); *G11B 2020/1222* (2013.01); *G11B 2020/1224* (2013.01); *G11B 2020/1225* (2013.01)

(58) Field of Classification Search
None
See application file for complete search history.

(56) References Cited

U.S. PATENT DOCUMENTS

| | | |
|---|---|---|
| 5,748,401 A | 5/1998 | Kawai |
| 5,784,219 A | 7/1998 | Genheimer |
| 5,838,512 A | 11/1998 | Okazaki |

(Continued)

FOREIGN PATENT DOCUMENTS

| | | |
|---|---|---|
| JP | 2001-35091 A | 2/2001 |
| JP | 2020-155172 A | 9/2020 |

*Primary Examiner* — Tan X Dinh
(74) *Attorney, Agent, or Firm* — Allen & Overy LLP

(57) ABSTRACT

According to one embodiment, a magnetic disk device includes a disk including two first servo sectors and at least a second servo sector, a head, and a controller, wherein the first servo sector includes burst data and a first data pattern written before the circumferential direction of the burst data, the second servo sector includes the burst data, the first data pattern, and a second data pattern written after the circumferential direction of the burst data, a first frequency of the first data pattern is different from a second frequency of the second data pattern, and a first length of the first data pattern is different from a second length of the second data pattern.

7 Claims, 12 Drawing Sheets

(56) References Cited

U.S. PATENT DOCUMENTS

| | | | |
|---|---|---|---|
| 6,034,835 A * | 3/2000 | Serrano | G11B 5/59655 360/75 |
| 6,469,853 B1 | 10/2002 | Satoh | |
| 6,738,207 B1 | 5/2004 | Belser et al. | |
| 7,046,465 B1 | 5/2006 | Kupferman | |
| 7,916,416 B1 | 3/2011 | Guo et al. | |
| 8,116,023 B1 | 2/2012 | Kupferman | |
| 8,125,725 B1 | 2/2012 | Ito | |
| 8,625,231 B1 | 1/2014 | Dhanda et al. | |
| 8,711,507 B1 * | 4/2014 | Katchmart | G11B 5/59616 360/51 |
| 8,824,081 B1 | 9/2014 | Guo et al. | |
| 9,025,269 B1 * | 5/2015 | Wong | G11B 5/59688 360/51 |
| 9,437,242 B1 * | 9/2016 | Banh | G11B 20/1217 |
| 10,163,459 B1 | 12/2018 | French, Jr. | |
| 10,360,930 B1 | 7/2019 | Asakura et al. | |
| 10,529,365 B2 | 1/2020 | Tagami et al. | |
| 10,748,569 B1 * | 8/2020 | Ogawa | G11B 5/59655 |
| 11,087,796 B2 * | 8/2021 | Tagami | G11B 5/012 |
| 11,100,947 B1 * | 8/2021 | Tagami | G11B 5/59605 |
| 2003/0112539 A1 | 6/2003 | Shu | |
| 2005/0068652 A1 | 3/2005 | Tomimoto | |
| 2013/0010382 A1 | 1/2013 | Nonaka et al. | |
| 2013/0010383 A1 | 1/2013 | Nonaka et al. | |
| 2013/0010388 A1 | 1/2013 | Nonaka et al. | |
| 2013/0010389 A1 | 1/2013 | Nonaka et al. | |
| 2014/0078614 A1 | 3/2014 | Sudo | |
| 2015/0103435 A1 | 4/2015 | Kosugi et al. | |
| 2015/0146318 A1 | 5/2015 | Yamada | |
| 2017/0186454 A1 | 6/2017 | Asakura et al. | |

* cited by examiner

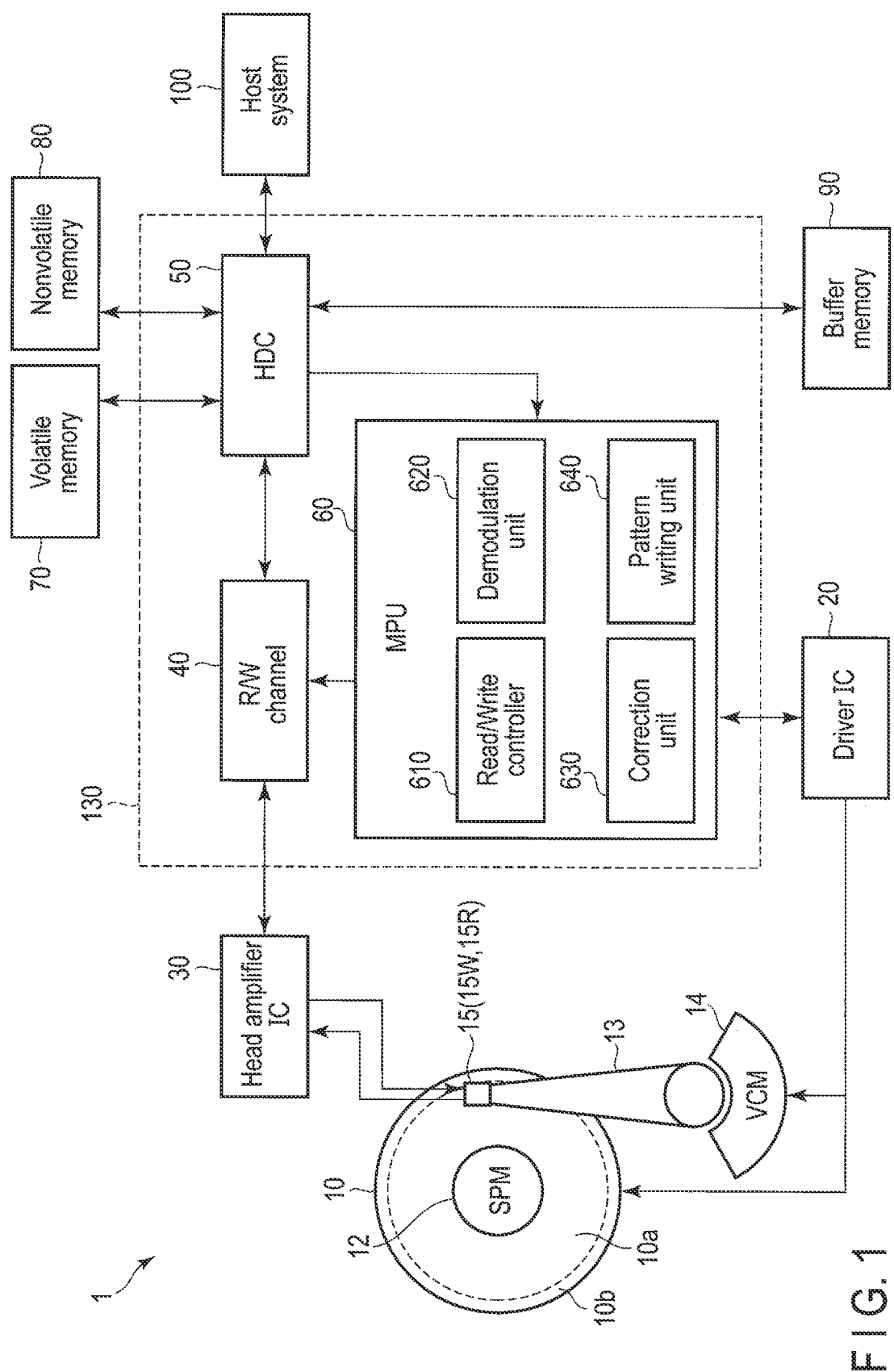
F I G. 1

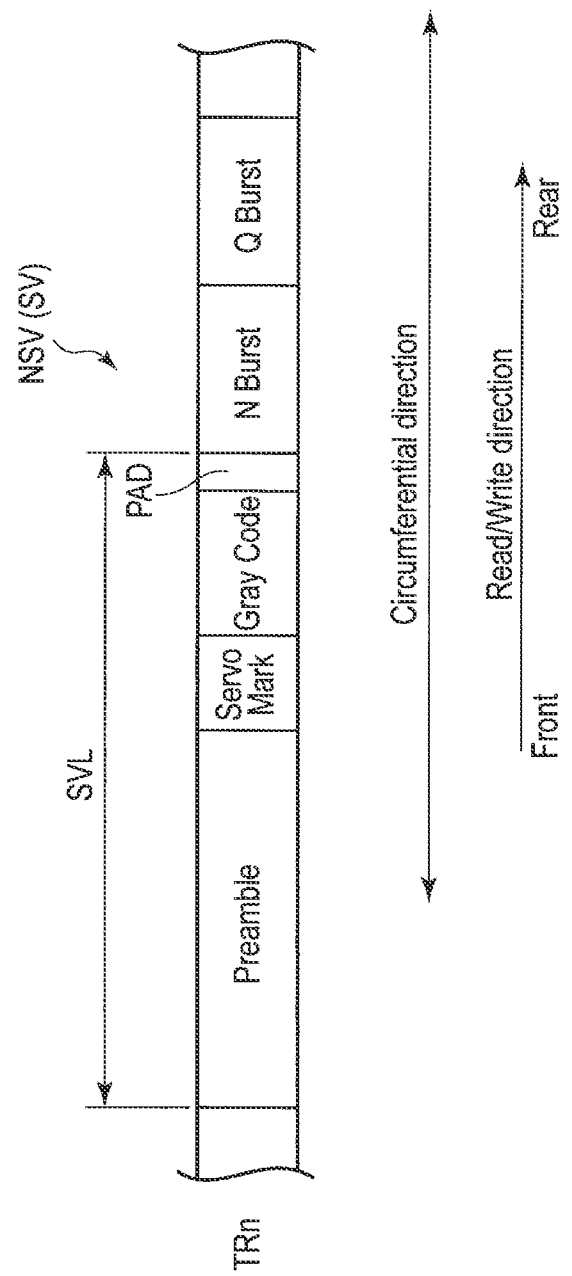
F I G. 3C

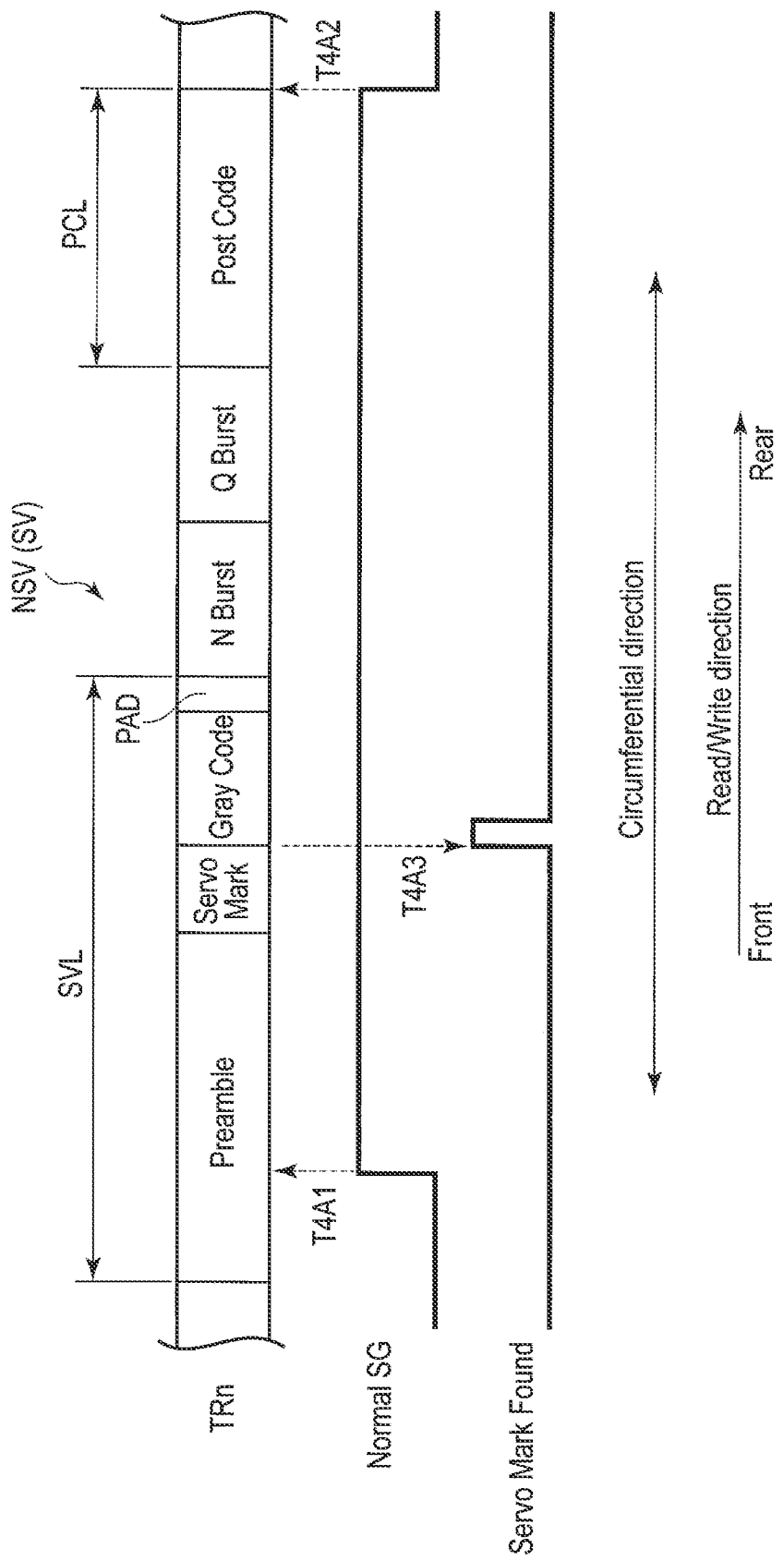
F I G. 4A

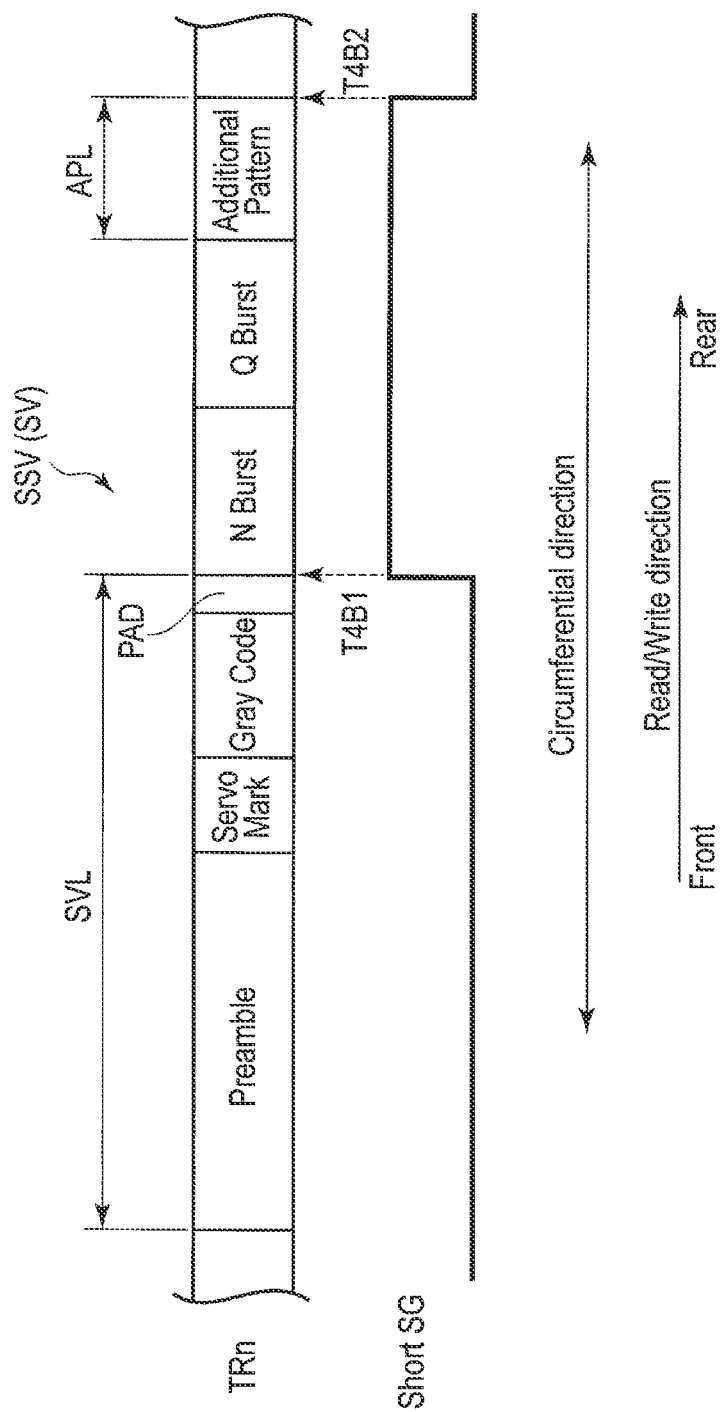
F I G. 4B

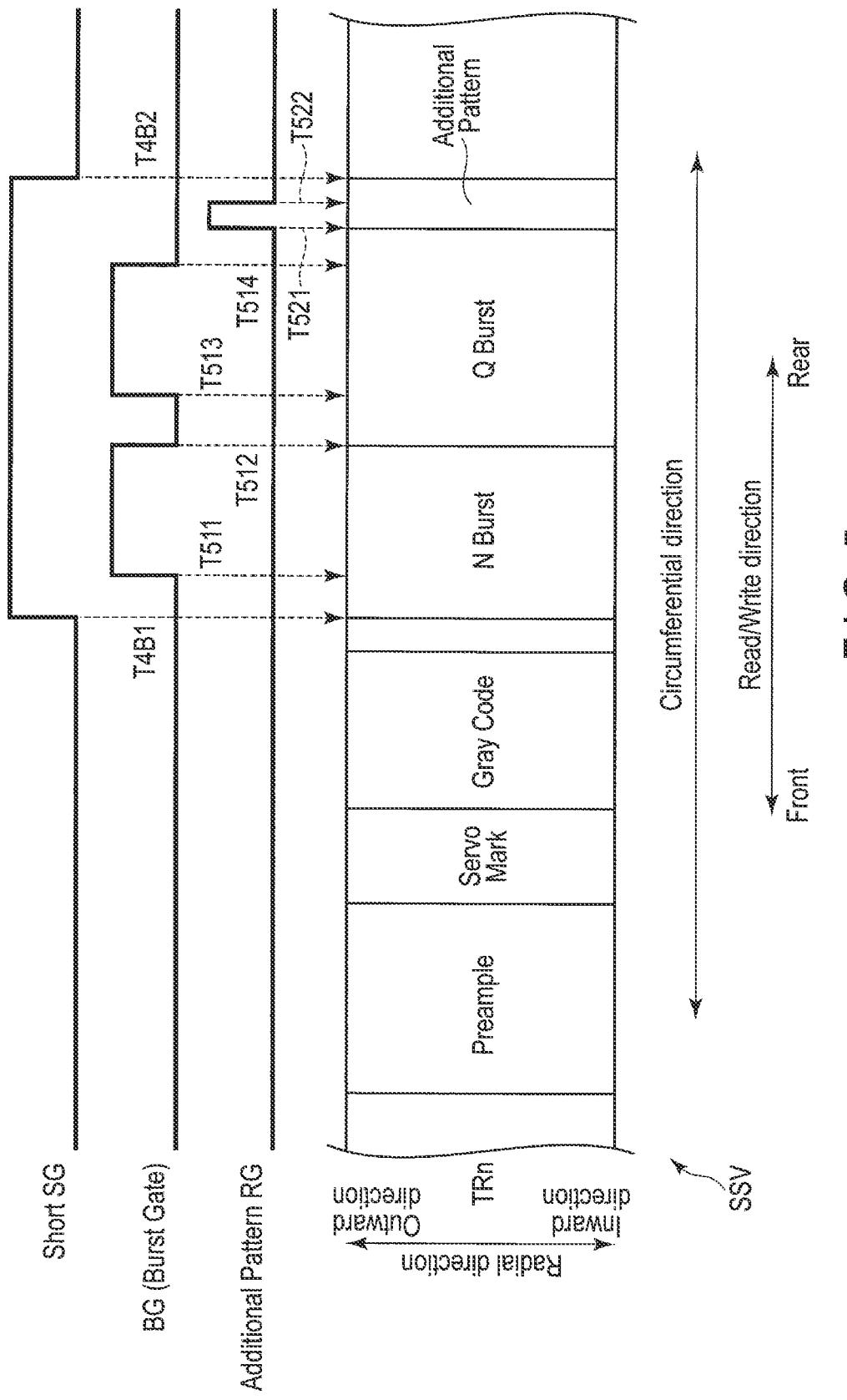
F I G. 5

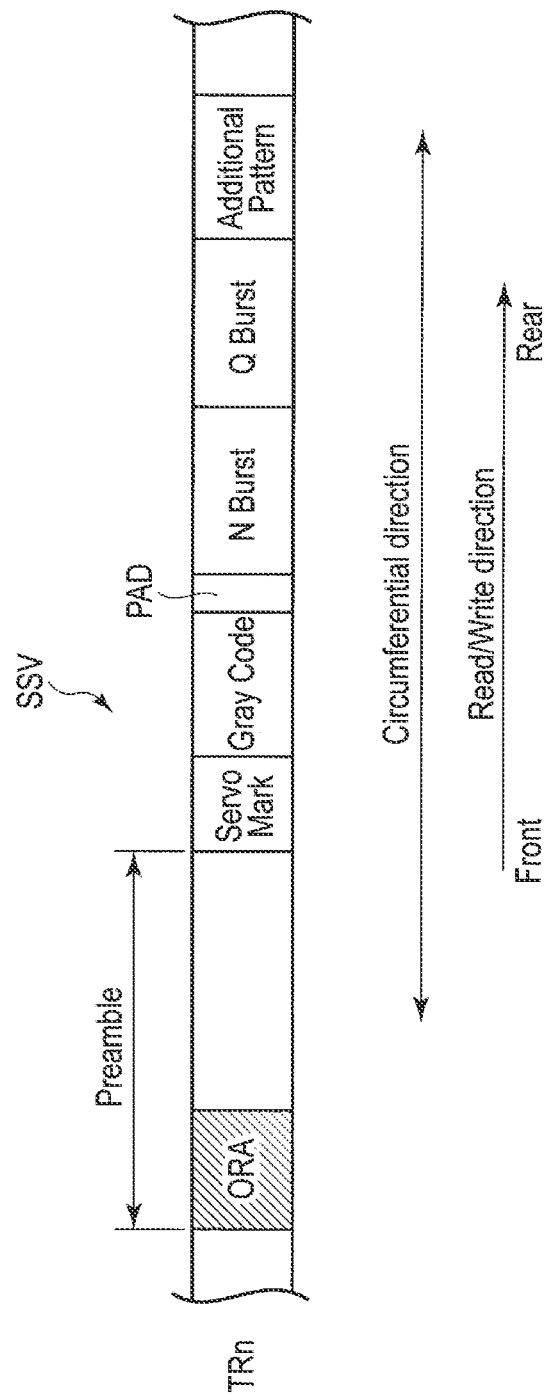
F I G. 12

MAGNETIC DISK DEVICE CAPABLE OF CORRECTING SERVO DEMODULATION POSITION

CROSS-REFERENCE TO RELATED APPLICATIONS

This application is a division of U.S. application Ser. No. 16/569,334, filed Sep. 12, 2019 (now allowed) and is based upon and claims the benefit of priority from Japanese Patent Application No. 2019-042706, filed Mar. 8, 2019, the entire contents of which are incorporated herein by reference.

FIELD

Embodiments described herein relate generally to a magnetic disk device, a writing method of a servo sector, and a method of correcting a servo demodulation position.

BACKGROUND

A magnetic disk device having a short servo sector whose circumferential length is shorter than a circumferential length of a normal servo sector has been considered. The magnetic disk device sequentially demodulates a preamble, a servo mark, a gray code, burst data, and a post code in a normal servo sector. The magnetic disk device demodulates only burst data in a short servo sector. Servo data read in the short servo sector is less than servo data read in the normal servo sector. Therefore, in the magnetic disk device, for example, the read timing cannot be synchronized by servo mark, the read timing changes, and the quality of the demodulation process of the short servo sector may be degraded. In addition, burst data is written in a data pattern whose phase is inverted by 180° in one servo track cycle in the radial direction of the disk. Therefore, when burst data is read in the short servo sector, it may be difficult to determine whether the read timing deviates or deviates in the radial direction.

BRIEF DESCRIPTION OF THE DRAWINGS

FIG. 1 is a block diagram illustrating a configuration of a magnetic disk device according to an embodiment.

FIG. 3C is a schematic diagram illustrating an example of a configuration of a normal servo according to an embodiment.

FIG. 4A is a diagram illustrating an example of a process of demodulating a particular normal servo of a particular track.

FIG. 4B is a diagram illustrating an example of a process of demodulating a particular short servo of a particular track.

FIG. 5 is a diagram illustrating an example of a process of demodulating N burst, Q burst, and additional pattern of a short servo in a short servo mode.

FIG. 12 is a schematic diagram illustrating an example of a configuration of a short servo according to Modification 1.

DETAILED DESCRIPTION

Figure 2:
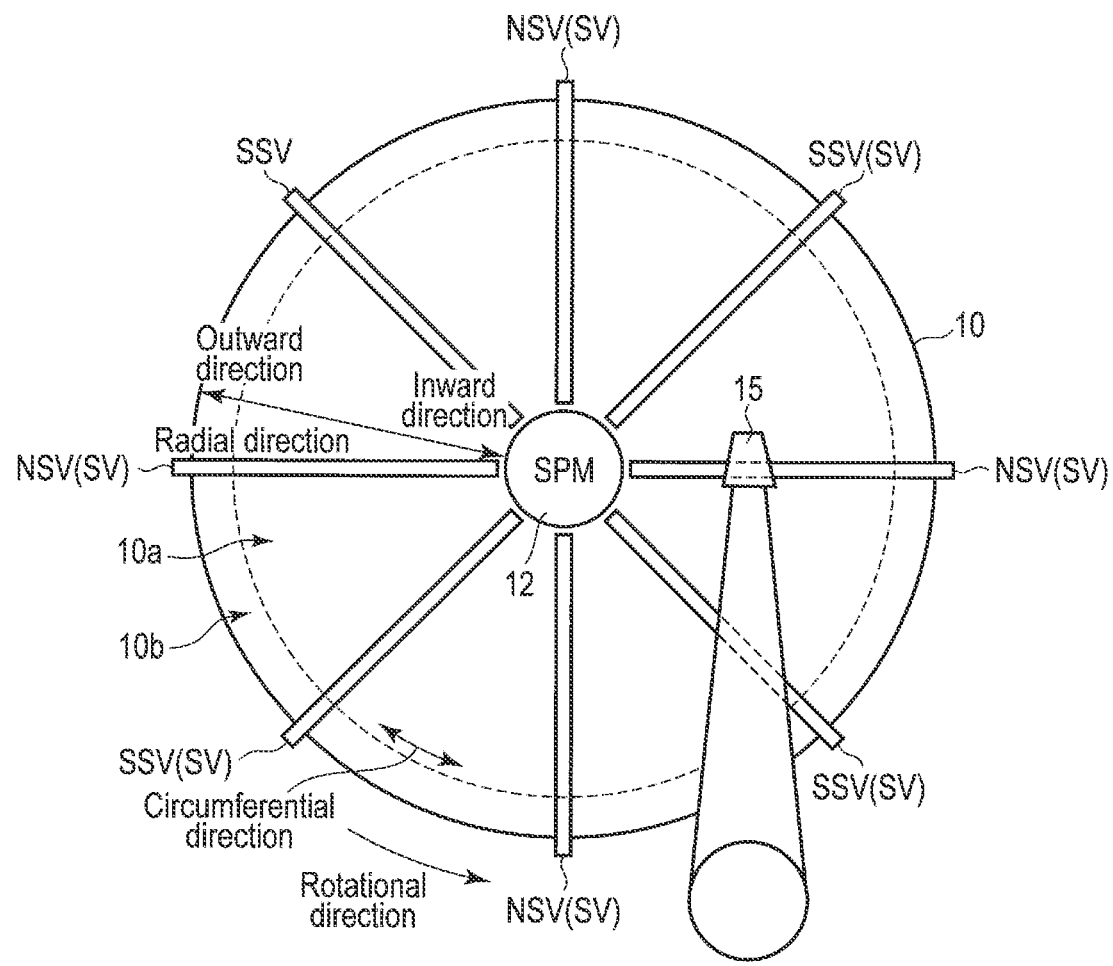
FIG. 2 is a schematic diagram illustrating an example of the arrangement of a normal servo and a short servo according to an embodiment.

In general, according to one embodiment, a magnetic disk device comprising: a disk comprising two first servo sectors arranged side by side in a circumferential direction and at least a second servo sector located between the two first servo sectors; a head that writes data to the disk and reads data from the disk; and a controller that demodulates all data of the first servo sector and demodulates data of part of the second servo sector, wherein the first servo sector comprises burst data and a first data pattern written before the circumferential direction of the burst data, the second servo sector comprises the burst data, the first data pattern written before the circumferential direction of the burst data, and a second data pattern written after the circumferential direction of the burst data, a first frequency of the first data pattern is different from a second frequency of the second data pattern, and a first length in the circumferential direction of the first data pattern is different from a second length in the circumferential direction of the second data pattern.

Hereinafter, embodiments will be described with reference to the drawings. Note that the drawings are merely examples and do not limit the scope of the invention.

Embodiment

FIG. 1 is a block diagram illustrating a configuration of a magnetic disk device 1 according to an embodiment.

The magnetic disk device 1 includes a head disk assembly (HDA) to be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 that is a 1-channel integrated circuit. In addition, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by the driving of the SPM 12. The arm 13 and the VCM 14 constitute an actuator. The actuator performs movement control such that the head 15 mounted on the arm 13 is moved to a particular position of the disk 10 by driving the VCM 14. The disk 10 and the head 15 may be provided in two or more numbers.

In the disk 10, a user data area 10a available from a user and a system area 10b for writing information necessary for system management are allocated in a region to which data can be written. Hereinafter, the direction orthogonal to the radial direction of the disk 10 is referred to as a circumferential direction. In addition, a particular position of the disk 10 in the radial direction may be referred to as a radial position, and a particular position of the disk 10 in the circumferential direction may be referred to as a circumferential position. The radial position corresponds to, for example, a track, and the circumferential position corresponds to, for example, a sector. The radial position and the circumferential position may be collectively referred to simply as a position.

The head 15 includes a slider as a main body, and includes a write head 15W and a read head 15R that are mounted on the slider. The write head 15W writes data to the disk 10. The read head 15R reads data recorded in the track on the disk 10. Note that the write head 15W may be simply referred to as the head 15, the read head 15R may be referred to simply as the head 15, and the write head 15W and the read head 15R may be collectively referred to as the head 15. The central portion of the head 15 may be referred to as the head 15, the central portion of the write head 15W may be referred to as the write head 15W, and the central portion of the read head 15R may be referred to as the read head 15R. The "track" is used as one of a plurality of radially divided regions of the disk 10, data extending in the circumferential direction of the disk 10, data written to the track, or various other meanings. The "sector" is used as one of a plurality of circumferentially divided regions of the track, data written to a particular position of the disk 10, data written to a sector, or other various meanings. In addition, the radial width of the track is referred to as a track width, and the central position of the track width is referred to as a track center.

FIG. 2 is a schematic diagram illustrating an example of the arrangement of a normal servo and a short servo according to an embodiment. As illustrated in FIG. 2, the direction toward the outer circumference of the disk 10 in the radial direction is referred to as an outward direction (outward), and the direction opposite to the outward direction is referred to as an inward direction (inward). In addition, FIG. 2 illustrates the rotational direction of the disk 10. Note that the rotational direction may be a reverse direction.

The disk 10 has a plurality of servo regions SV. Hereinafter, the servo region SV may be referred to as a servo sector. The plurality of servo regions SV extend radially in the radial direction of the disk 10 and are discretely arranged at particular intervals in the circumferential direction. A recording area for writing user data and the like is arranged between two servo regions SV continuous in the circumferential direction. The servo region SV has, for example, a servo region NSV (hereinafter referred to as a normal servo) and a servo region (hereinafter referred to as a short servo, a short servo sector, or a short servo area) SSV different from the servo region NSV. The length of the data pattern in the circumferential direction of the short servo SSV (hereinafter also simply referred to as the length) is shorter than the length of the normal servo NSV. In the example illustrated in FIG. 2, the normal servo NSV and the short servo SSV are alternately arranged in the circumferential direction. In other words, one short servo SSV is arranged between two continuous normal servos NSV in the circumferential direction. Note that two or more short servos SSV may be arranged between two continuous normal servos NSV in the circumferential direction.

Figure 3A:
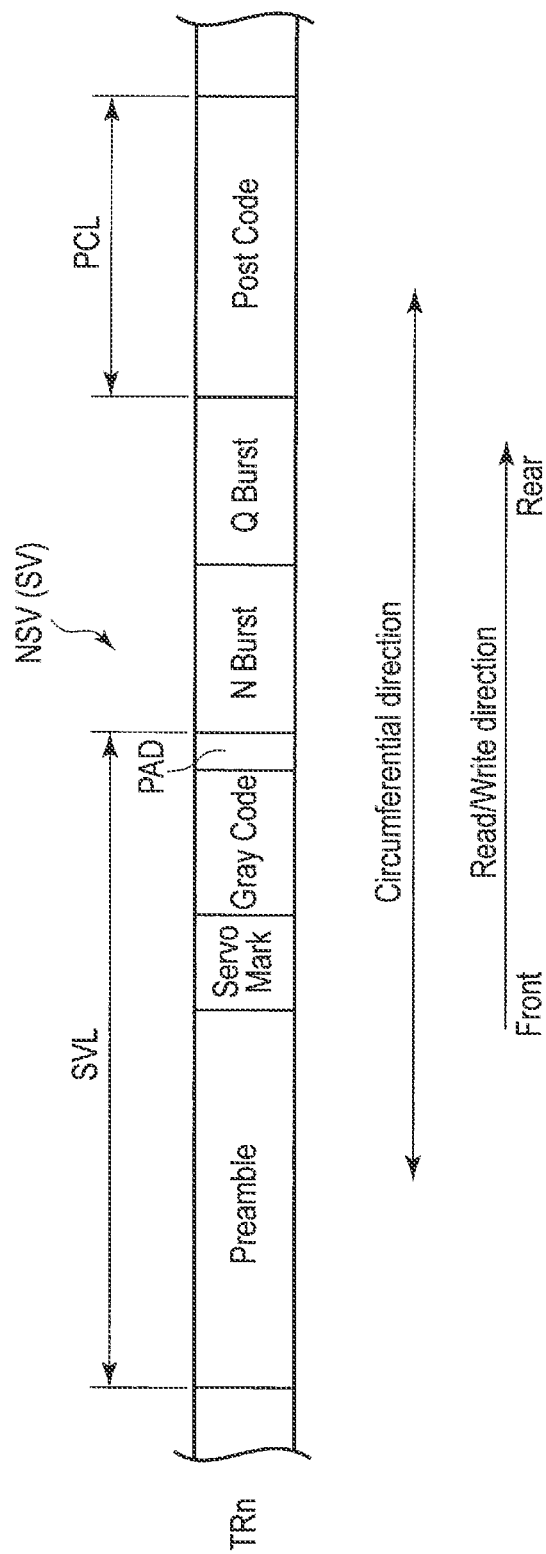
FIG. 3A is a schematic diagram illustrating an example of a configuration of a normal servo according to an embodiment.

FIGS. 3A and 3C are schematic diagrams illustrating an example of the configuration of the normal servo NSV according to the present embodiment. FIGS. 3A and 3C illustrate a particular normal servo NSV written to a particular track TRn. As illustrated in FIGS. 3A and 3C, in the circumferential direction, a direction of reading/writing is referred to as a read/write direction. The read/write direction corresponds to, for example, a direction opposite to the rotational direction illustrated in FIG. 2. The read/write direction is a direction from a front side to a rear side. The front side corresponds to a direction forward in time, and the rear side corresponds to a direction backward in time. Hereinafter, the front side may be simply referred to as the front, and the rear side may be simply referred to as the rear.

The normal servo NSV includes servo data, for example, a preamble, a servo mark, a gray code, a PAD, burst data, and a post code. Note that, as illustrated in FIG. 3C, the normal servo NSV may not include the post code. The preamble, the servo mark, the gray code, the PAD, the burst data, and the post code are sequentially arranged in this order from the front to the rear of the read/write direction. The preamble includes preamble information for synchronizing with a reproduction signal of the servo pattern including the servo mark and the gray code. The servo mark includes servo mark information indicating the start of the servo pattern. The gray code includes an address of a particular track (cylinder address) and an address of a servo sector of the particular track. The burst data is data (relative position data) used to detect radial and/or circumferential positional deviation (positional error) of the head 15 with respect to a track center of a particular track, and includes a repeating pattern having a particular cycle. Hereinafter, the radial position deviation (positional error) of the head 15 with respect to the track center of the particular track detected by using the burst data is referred to as a servo demodulation position, a servo off track position, or a demodulation position. The PAD includes PAD information of a synchronization signal such as a gap and a servo AGC. The burst data is written in a data pattern in which the phase of the burst data is inverted by 180° in one servo track cycle in the radial direction of the disk 10. In other words, a phase of a waveform of burst data calculated by demodulating particular burst data by, for example, discrete Fourier transform (DFT) or the like is inverted by 180° with respect to a phase of adjacent burst data calculated by demodulating particular burst data adjacent in the radial direction of the burst data (hereinafter referred to as adjacent burst data). The servo track (servo cylinder) corresponds to a track to be subjected to write processing or read processing according to a command from the host 100 or the like. Hereinafter, for convenience of explanation, the "phase of the waveform of the particular data calculated by demodulating the particular data by, for example, discrete Fourier transform" is simply referred to as the "phase of the particular data". The burst data is used, for example, to acquire the radial and/or circumferential position (hereinafter also referred to as a head position) of the head 15 on the disk 10. The burst data includes, for example, N burst and Q burst. The N burst and the Q burst are written in data patterns in which the phases deviate by 90° with each other in the radial direction of the disk 10. In other words, the phases of the N burst and the phase of the Q burst, for example, radially deviate from each other by 90°. The post code includes data (hereinafter referred to as RRO correction data) or the like for correcting an error caused by track distortion with respect to the track center (target path) concentric with the disk 10 caused by a shake (repeated run out (RRO)) synchronized with the rotation of the disk 10 when servo data is written to the disk. Hereinafter, for convenience of explanation, the error caused by track distortion with respect to the track center caused by the RRO may be simply referred to as RRO. In addition, the post code may also include a post code corresponding to the short servo SSV. The frequency of the waveform of the particular post code calculated by demodulating the particular post code by, for example, discrete Fourier transform is equal to the frequency of the waveform of the particular preamble calculated by demodulating the particular preamble by, for example, discrete Fourier transform. Hereinafter, for convenience of explanation, the "frequency of the waveform of the particular data calculated by demodulating the particular data by discrete Fourier transform or the like" is simply referred to as the "frequency of data". The phase of the post code changes irregularly in the circumferential direction. The length PCL of the post code is, for example, several tens of dibits. Here, 1 dibit is the reciprocal of the frequency of the preamble (servo preamble). In other words, 1 dibit corresponds to the period of the waveform of the particular preamble calculated by demodulating the preamble by, for example, discrete Fourier transform. Hereinafter, for convenience of explanation, the "period of the waveform of the particular data calculated by demodulating the particular data by discrete Fourier transform or the like" is simply referred to as the "period of data". When it is assumed that the frequency of the preamble is FP, 1 dibit is represented by 1/FP.

Figure 3B:
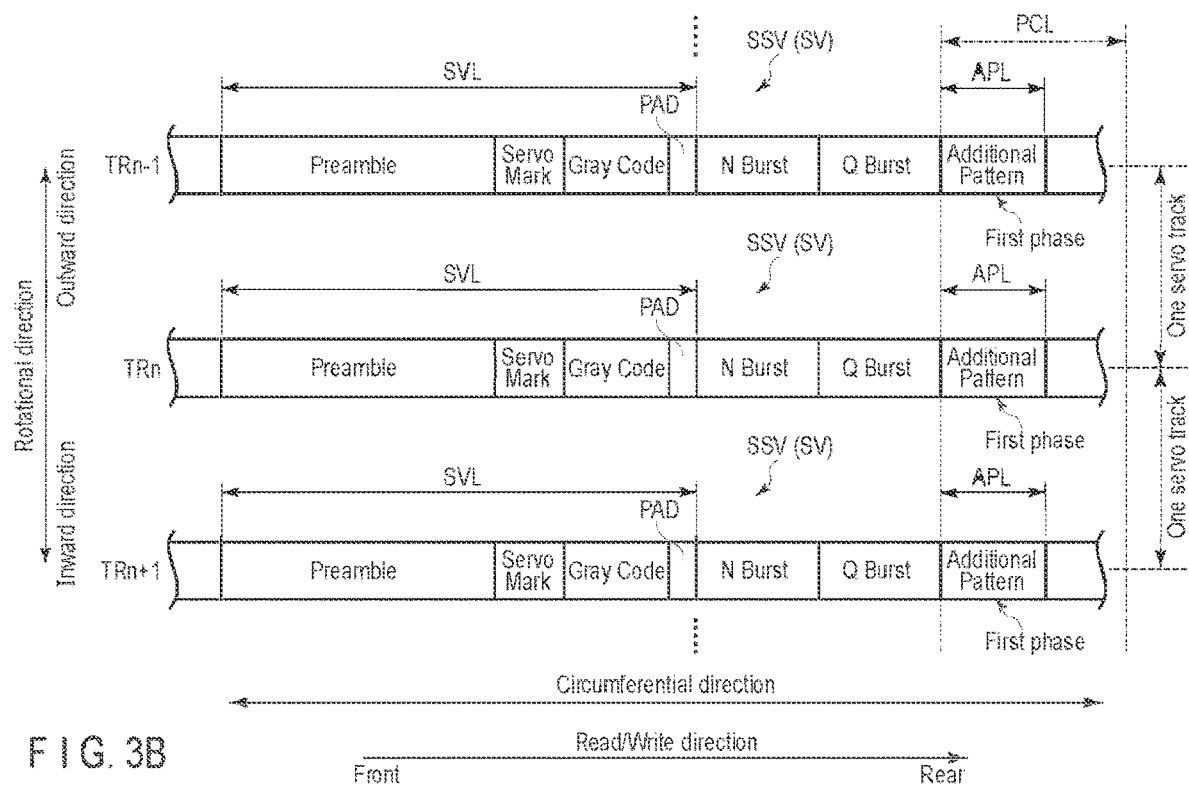
FIG. 3B is a schematic diagram illustrating an example of a configuration of a short servo according to an embodiment.

FIG. 3B is a schematic diagram illustrating an example of the configuration of the short servo SSV according to the present embodiment. FIG. 3B illustrates a short servo SSV written to each of tracks TRn−1, TR, and TRn+1 sequentially arranged at intervals in one servo track cycle in the radial direction.

The short servo SSV includes servo data, for example, a preamble, a servo mark, a gray code, a PAD, burst data (N burst and Q burst), and an additional pattern. The preamble, the servo mark, the gray code, the PAD, the burst data, and the additional pattern are sequentially arranged in this order from the front to the rear of the read/write direction. The length of the preamble of the short servo SSV is equal to, for example, the length of the preamble of the normal servo NSV. Note that the length of the preamble of the short servo SSV may be different from the length of the preamble of the normal servo NSV. The length of the servo mark of the short servo SSV is equal to, for example, the length of the servo mark of the normal servo NSV. Note that the length of the servo mark of the short servo SSV may be different from the length of the servo mark of the normal servo NSV. The length of the gray code of the short servo SSV is equal to, for example, the length of the gray code of the normal servo NSV. Note that the length of the gray code of the short servo SSV may be different from the length of the gray code of the normal servo NSV. The length of the PAD of the short servo SSV is equal to, for example, the length of the PAD of the normal servo NSV. Note that the length of the PAD of the short servo SSV may be different from the length of the PAD of the normal servo NSV. The length of the burst data of the short servo SSV is equal to, for example, the length of the burst data of the normal servo NSV. Note that the length of the burst data of the short servo SSV may be different from the length of the burst data of the normal servo NSV. The length of the N burst of the short servo SSV is equal to, for example, the length of the N burst of the normal servo NSV. Note that the length of the N burst of the short servo SSV may be different from the length of the N burst of the normal servo NSV. The length of the Q burst of the short servo SSV is equal to, for example, the length of the Q burst of the normal servo NSV. Note that the length of the Q burst of the short servo SSV may be different from the length of the Q burst of the normal servo NSV. The additional pattern is data different from the post code. The frequency of the additional pattern is different from the frequency FP of the preamble. In other words, the frequency of the additional pattern is different from the frequency of the post code. For example, the frequency of the additional pattern is equal to the frequency of the burst data, for example, the frequency of the N burst and the frequency of the Q burst. For example, the frequency of the additional pattern is FP/2. The phase of the additional pattern (first phase) periodically changes in the circumferential direction. The additional pattern is written in the data pattern in which the phases are equal in one servo track cycle in the radial direction of the disk 10. In other words, the phase of the particular additional pattern (first phase) is equal to the phase of the additional pattern (first phase) radially adjacent to the particular additional pattern (hereinafter referred to as the adjacent additional pattern). The length APL of the additional pattern is shorter than the length PCL of the post code. For example, when it is assumed that the frequency of the additional pattern is FAD, the length APL of the additional pattern is represented by the following equation.

$$PCL > APL \geq (2/FP + 1/FAD) \tag{1}$$

Here, 2/FP is, for example, 2 dibits. In other words, the length APL of the additional pattern is equal to or longer than the sum of twice the one cycle of the preamble and the one cycle of the additional pattern. For example, the length APL of the additional pattern is 4 dibits or more and less than the length PCL of the post code. In addition, the length APL of the additional pattern is less than the sum SVL of the lengths up to the preamble, the servo mark, the gray code, and the PAD.

$$SVL \geq PCL > APL \geq (2/FP + 1/FAD)$$

The driver IC 20 controls the driving of the SPM 12 and the VCM 14 according to the control of the system controller 130 (specifically, the MPU 60 described later).

The head amplifier IC (preamplifier) 30 includes a read amplifier and a write driver. The read amplifier amplifies a read signal read from the disk 10 and outputs the amplified read signal to the system controller 130 (specifically, the read/write (R/W) channel 40 described later). The write driver outputs, to the head 15, a write current corresponding to a signal output from the R/W channel 40.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Note that the buffer memory 90 may be integrated with the volatile memory 70. The buffer memory 90 is, for example, a DRAM, a static random access memory (SRAM), an SDRAM, a ferroelectric random access memory (FeRAM), and a magnetoresistive random access memory (MRAM).

The system controller (controller) 130 is realized by, for example, using a large scale integrated circuit (LSI) called a system-on-a-chip (SoC) in which a plurality of elements are integrated on a single chip. The system controller 130 includes a read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the nonvolatile memory 80, the buffer memory 90, the host 100, and the like.

The R/W channel 40 performs signal processing of read data transferred from the disk 10 to the host 100 and write data transferred from the host 100 in response to an instruction from the MPU 60 described later. The R/W channel 40 has a circuit or function that measures the signal quality of the read data. The R/W channel 40 is electrically connected to, for example, the head amplifier IC 30, the HDC 50, and the MPU 60.

The HDC 50 controls data transfer between the host 100 and the R/W channel 40 in response to an instruction from the MPU 60 described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 through the driver IC 20 and performs servo control for positioning the head 15. In addition, the MPU 60 controls the SPM 12 through the driver IC 20 and rotates the disk 10. The MPU 60 controls the operation of writing data to the disk 10 and selects the storage destination of the write data. In addition, the MPU 60 controls the operation of reading data from the disk 10 and controls the processing of read data. The MPU 60 is connected to each unit of the magnetic disk device 1. The MPU 60 is electrically connected to, for example, the driver IC 20, the R/W channel 40, and the HDC 50.

The MPU 60 includes a read/write controller 610, a demodulation unit 620, a correction unit 630, and a pattern writing unit 640. The MPU 60 performs the processing of these units, for example, the read/write controller 610, the demodulation unit 620, the correction unit 630, and the pattern writing unit 640 on firmware. Note that the MPU 60 may include these units, for example, the read/write controller 610, the demodulation unit 620, the correction unit 630, and the pattern writing unit 640 as circuits.

The read/write controller 610 controls data read processing and write processing according to a command from the host 100. The read/write controller 610 controls the VCM 14 through the driver IC 20, positions the head 15 at a particular position of the disk 10, and reads or writes data.

The demodulation unit 620 positions the head 15 (the read head 15R) at a particular position (hereinafter referred to as a servo demodulation position) of a servo region SV of a particular track through the R/W channel 40, and performs demodulation processing on read data read at a particular timing (hereinafter referred to as a read timing). Hereinafter, the servo demodulation position in the radial direction may be referred to as a servo radial position or simply as a servo demodulation position, the servo demodulation position in the circumferential direction may be referred to as a servo circumferential position or simply a servo demodulation position, and the radial and circumferential servo demodulation positions may be collectively referred to as a servo demodulation position. Note that the demodulation unit 620 may be included in the R/W channel 40. The demodulation unit 620 positions the head 15 (the read head 15R) at a target servo demodulation position (hereinafter referred to as a target servo demodulation position) calculated based on particular data of a normal servo NSV of a particular track, starts reading the normal servo NSV at a particular read timing (hereinafter referred to as a start timing), reads and demodulates from a preamble to a post code, and ends the reading of the normal servo NSV at a particular read timing (hereinafter referred to as an end timing). Note that, when no post code is included in the normal servo NSV, the demodulation unit 620 may read from the preamble to the burst. The demodulation unit 620 positions the head 15 (the read head 15R) at the target servo demodulation position of the short servo SSV calculated based on the particular data of the normal servo NSV read immediately before, starts the reading of the short servo SSV at a particular start timing based on the timing when the particular data is read by the normal servo NSV read immediately before, reads and demodulates the N burst, the Q burst, and the additional pattern, and ends the reading of the short servo SSV at a particular end timing. The read/write controller 610, for example, performs setting such that the time for reading the N burst, the Q burst, and the additional pattern with the servo SSV shorter than the time for reading the N burst, the Q burst, and the post code with the normal servo NSV, is shortened by the time corresponding to a difference between the length of the post code and the length of the additional pattern. Note that when the normal servo NSV does not include the post code, the read/write controller 610, for example, performs setting such that the time for reading the N burst, the Q burst, and the additional pattern with the servo SSV longer than the time for reading the N burst and the Q burst with the normal servo NSV is lengthened by the time corresponding to the length of the additional pattern.

FIG. 4A is a diagram illustrating an example of a process of demodulating a particular normal servo NSV of a particular track TRn. FIG. 4A illustrates a normal servo gate (Normal SG) that demodulates all the servo data written in the servo region SV, and Servo Mark Found indicating the timing at which the servo mark is detected (read). The Normal SG rises at a start timing T4A1 corresponding to the leading end of the preamble and falls at an end timing T4A2 corresponding to the trailing end of the post code. The Servo Mark Found rises at a timing T4A3 corresponding to the rear end portion of the servo mark.

The demodulation unit 620 positions the read head 15R at the particular track TRn based on the preamble, the servo mark, the gray code, and the like of the normal servo NSV of the track TRn, starts reading the normal servo NSV at the start timing T4A1, positions the read head 15R at the target servo demodulation position of the particular track TRn, reads and demodulates the servo mark, the gray code, the PAD, the N burst, the Q burst, and the post code in this order, and ends the reading at the end timing T4A2 at which the post code is read. The demodulation unit 620 detects the timing T4A3 at which the servo mark is detected (read). For example, the demodulation unit 620 reads the N burst or the Q burst based on the timing T4A3 at which the servo mark is detected.

FIG. 4B is a diagram illustrating an example of a process of demodulating a particular short servo SSV of a particular track TRn. The short servo SSV illustrated in FIG. 4B corresponds to the servo region SV located immediately after the normal servo NSV illustrated in FIG. 4A. FIG. 4B illustrates a servo gate (short SG) that demodulates part of servo data written in the servo region SV. The short SG rises at the start timing T4B1 corresponding to the leading end of the N burst and falls at the timing T4B2 corresponding to the trailing end of the additional pattern.

The demodulation unit 620 sets the start timing T4B1 based on, for example, the timing T4A3 of the Servo Mark Found illustrated in FIG. 4A. For example, the demodulation unit 620 sets the timing T4B1, which is a particular time after the timing T4A3 illustrated in FIG. 4A, as the start timing for starting the demodulation of the short servo SSV. The demodulation unit 620 positions the read head 15R at the particular track TRn based on the preamble, the servo mark, the gray code, and the like of the normal servo NSV of the track TRn read immediately before, starts the reading of the short servo SSV at the start timing T4B1, positions the read head 15R at the target servo demodulation position of the particular track TRn, reads and demodulates the N burst, the Q burst, and the additional patterns in this order, and ends the reading of the short servo SSV at the end timing T4B2 at which the additional pattern is read. For example, the demodulation unit 620 sets the end timing T4B2 based on the time for reading the N burst, the Q burst, and the post code of the normal servo NSV illustrated in FIG. 4A, the start timing T4B1, the length of the post code, the length of the additional pattern. As one example, the demodulation unit 620 sets the timing T4B2 after the time corresponding to a difference between the time for reading the N burst, the Q burst, and the post code of the normal servo NSV illustrated in FIG. 4A and the time corresponding to a difference between the length of the post code and the length of the additional pattern, from the start timing T4B1, as the end timing for ending the reading of the short servo SSV. Note that the demodulation unit 620 may be capable of selecting whether to demodulate the particular servo region SV with the normal SG or the short SG. Hereinafter, the process of demodulating the normal servo NSV and the short servo SSV of the servo region SV with the normal SG may be referred to as a normal servo mode, and the process of demodulating the normal servo NSV of the servo region SV with the normal SG and demodulating the short servo SSV of the servo region SV with the short SG may be referred to as a short servo mode. For example, in the normal servo mode, the demodulation unit 620 demodulates the preamble, the servo mark, the gray code, the PAD, the N burst, the Q burst, and the post code of the normal servo NSV, and demodulates the preamble, the servo mark, the gray code, the PAD, the N burst, the Q burst, and the additional pattern of the short servo SSV. For example, in the short servo mode, the demodulation unit 620 demodulates the preamble, the servo mark, the gray code, the PAD, the N burst, the Q burst, and the post code of the normal servo NSV, and demodulates the N burst, the Q burst, and the additional pattern of the short servo SSV.

For example, the demodulation unit 620 may perform demodulation by using the normal servo mode during the seek operation, and may perform demodulation after switching to the short servo mode before performing the data write/read operation after the seek.

FIG. 5 is a diagram illustrating an example of a process of demodulating the N burst, the Q burst, and the additional pattern of the short servo SSV in the short servo mode. The short servo SSV illustrated in FIG. 5 corresponds to the short servo SSV illustrated in FIG. 4B. FIG. 5 illustrates a short SG, a gate (burst gate: BG) for demodulating burst data (N burst and Q burst), and a gate for demodulating an additional pattern (additional pattern read gate: additional pattern RG). The BG rises at a start timing T511 corresponding to the leading end of the N burst, falls at an end timing T512 corresponding to the trailing end of the N burst, rises at a start timing T513 corresponding to the leading end of the Q burst, and falls at an end timing T514 corresponding to the trailing end of the Q burst. In addition, the additional pattern RG rises at a start timing T521 corresponding to the leading end of the additional pattern, and falls at an end timing T522 corresponding to the trailing end of the additional pattern.

The demodulation unit 620 positions the read head 15R at the particular track TRn based on the preamble, the servo mark, the gray code, and the like of the normal servo NSV of the track TRn read immediately before, starts the reading of the N burst at the start timing T511 set based on the gray code and the like of the normal servo NSV read immediately before, reads the N burst, performs demodulation by, for example, discrete Fourier transform, to calculate the phase and amplitude of the N burst, ends the reading of the N burst at the end timing T512, starts the reading of the Q burst at the start timing T513, reads the Q burst, performs demodulation by, for example, discrete Fourier transform, to calculate the phase and amplitude of the Q burst, and ends the reading of the Q burst at the end timing T514. Note that, instead of the phase and the amplitude, a sin component and a cos component of the N burst or the Q burst may be calculated by discrete Fourier transform or the like. The demodulation unit 620 starts the reading of the additional pattern at the start timing T521, reads the additional pattern, performs demodulation by, for example, discrete Fourier transform or the like to calculate the phase of the additional pattern, and ends the reading of the additional pattern at the end timing T522. Note that, in addition to reading the additional pattern and calculating the phase of the additional pattern by discrete Fourier transform or the like, the amplitude may be simultaneously calculated. In addition, instead of the phase and the amplitude, a sin component and a cos component may be calculated.

When the short servo SSV is demodulated in the short servo mode, the demodulation unit 620 does not read the preamble, the servo mark, the gray code, and the like of the short servo SSV. Therefore, there is a possibility that the servo demodulation position (servo circumferential position) may deviate in the circumferential direction with respect to the target servo demodulation position, for example, the target servo circumferential position because the start timing T4B1 or the end timing T4B2 of the short servo SSV deviate from the target timing. In addition, when the short servo SSV is demodulated in the short servo mode, the demodulation unit 620 does not read the preamble, the servo mark, the gray code, and the like of the short servo SSV. Therefore, there is a possibility that the servo demodulation position (servo radial position) may deviate in the radial direction with respect to the target servo demodulation position, for example, the target servo radial position.

The correction unit 630 corrects the servo demodulation position. For example, the correction unit 630 corrects the servo demodulation position of the short servo SSV based on the phase of the N burst, the phase of the Q burst, and the phase of the additional pattern respectively acquired by demodulating the N burst, the Q burst, and the additional pattern of the short servo SSV. When it is determined that the phase of the additional pattern deviates by a particular value (threshold value) or more with respect to a reference phase (hereinafter referred to as a reference additional pattern phase), the correction unit 630 determines that the servo circumferential position deviates with respect to the target servo circumferential position because the read timing of the short servo SSV deviates, corrects the servo demodulation position (radial position) of the short servo SSV so as to correct the servo demodulation position (radial position) by correcting a wrong servo demodulation position (radial position). In other words, when it is determined that the absolute value of (the phase of the additional pattern–the phase of the reference additional pattern)≥the threshold value, the correction unit 630 determines that the read timing of the short servo SSV, for example, the read timings of the N burst, the Q burst, and the additional pattern deviate, and corrects the servo demodulation position (radial position) of the short servo SSV.

Figure 6:
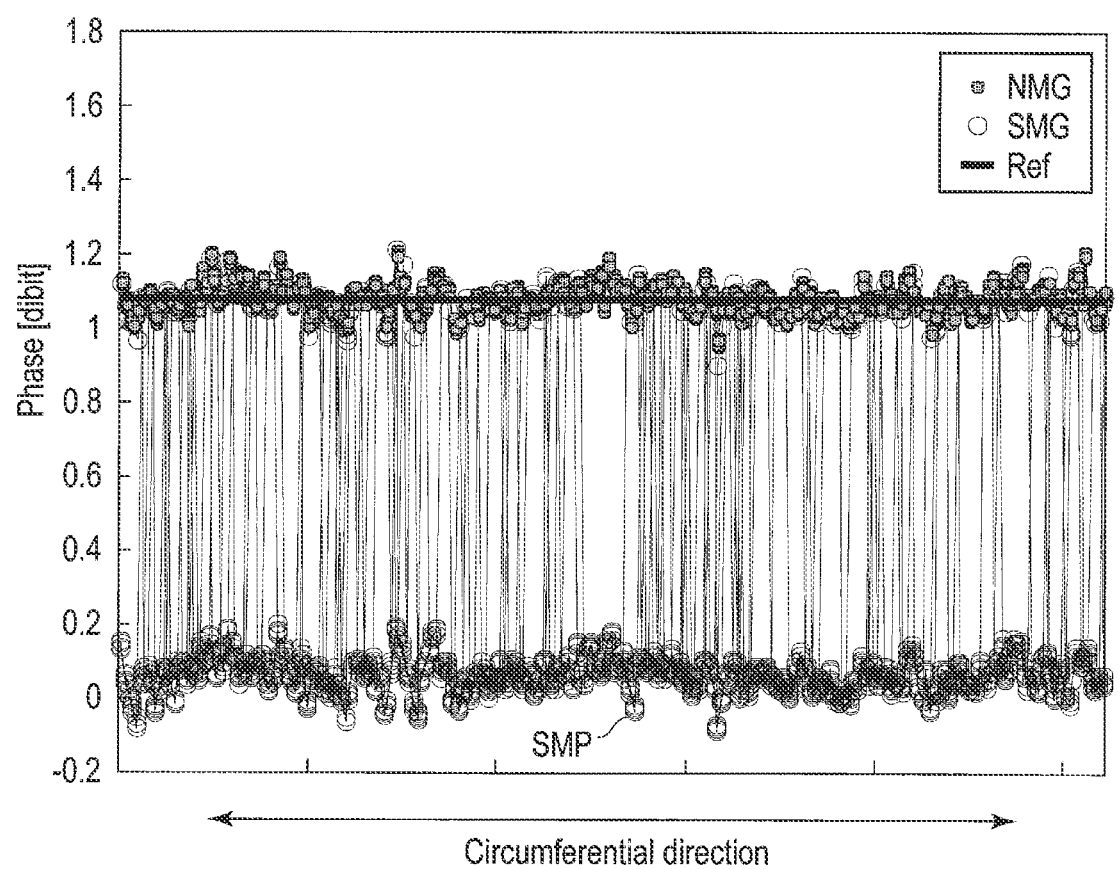
FIG. 6 is a diagram illustrating an example of a phase of each additional pattern corresponding to each circumferential position of a particular track demodulated in a normal servo mode and a phase of each additional pattern corresponding to each circumferential position of a particular track demodulated in a short servo mode.

FIG. 6 is a diagram illustrating an example of a phase of each additional pattern corresponding to each circumferential position of a particular track demodulated in a normal servo mode and a phase of each additional pattern corresponding to each circumferential position of a particular track demodulated in a short servo mode. In FIG. 6, a horizontal axis represents a circumferential direction, and a vertical axis represents a phase [dibit]. FIG. 6 illustrates a phase (hereinafter referred to as a phase group of additional patterns in the normal servo mode) NMG of each additional pattern corresponding to each circumferential position of a particular track demodulated in the normal servo mode, a phase (hereinafter referred to as a phase group of additional patterns in the short servo mode or simply as a phase group of additional patterns) SMG of each additional pattern corresponding to each circumferential position of a particular track demodulated in the short servo mode, and a reference additional pattern phase Ref. The reference additional pattern phase Ref is set based on a phase calculated by demodulating a plurality of additional patterns respectively written to a plurality of servo regions of a plurality of tracks. For example, the reference additional pattern phase Ref is set based on the average value of the phase group NMG of the additional patterns in the normal servo mode. A part of the phase group SMG of the additional patterns deviates by 1 dibit, for example, 180°, with respect to the reference additional pattern phase Ref (the phase group NMG of the additional patterns in the normal servo mode).

When it is determined that the phase SMP of the additional pattern in the phase group SMG of the additional patterns deviates by the threshold value or more with respect to the reference additional pattern phase Ref, the correction unit 630 corrects the servo demodulation position (radial position) of the short servo SSV. When it is determined that the phase SMP of the additional pattern in the phase group SMG of the additional patterns deviates by the threshold value, for example, 0.5 or more with respect to the reference additional pattern phase Ref, the correction unit 630 corrects the servo demodulation position of the short servo SSV by one servo track. The servo demodulation position (Demodpos) that can be calculated from the N burst and the Q burst is calculated in the range of ±one servo track. In other words, the servo demodulation position calculated from the N burst and the Q burst is in the range of ±one servo track with respect to the servo cylinder. Based on the sign of the servo demodulation position calculated from the N burst and the Q burst, one servo track subtraction correction is performed if the sign is positive and one servo track addition correction is performed if the sign is negative.

If Demodpos≥0, after Demodpos correction=before Demodpos correction−1

If Demodpos<0, after Demodpos correction=between Demodpos corrections+1

Note that, when it is determined that the phase SMP of the additional pattern in the phase group SMG of the additional patterns does not deviate by 0.5 or more with respect to the reference additional pattern phase Ref, the correction unit 630 does not correct the servo demodulation position (radial position) of the short servo SSV. Note that the phase acquired from the additional pattern may be used for initial phase correction of the N burst and the Q burst or disk synchronous write (DSW) correction. In addition, when the amplitude is acquired from the additional pattern, it may be used for head flying height correction.

In addition, when it is determined that the phase of the N burst and the phase of the Q burst of the short servo SSV deviate with respect to a reference phase (hereinafter referred to as a reference burst phase) and the phase of the additional pattern does not deviate with respect to the phase of the reference additional pattern, the correction unit 630 determines that the servo radial position of the short servo SSV deviates with respect to the target servo radial position.

For example, when it is determined that the phase of the N burst and the phase of the Q burst of the short servo SSV are inverted by 1800 with respect to the reference burst phase and the servo radial position is smaller than the target servo radial position, the correction unit 630 determines that the servo demodulation position deviates by one track outward in the radial direction and reflects the same to the position control of the next servo sector. Here, the target servo radial position corresponds to, for example, the track center of the particular track. For example, the target servo radial position may be 0. For example, when it is determined that the phase of the N burst and the phase of the Q burst of the short servo SSV are inverted by 180° with respect to the reference burst phase and the servo radial position is equal to or greater than the target servo radial position, the correction unit 630 determines that the servo demodulation position deviates by one track inward in the radial direction and reflects the same to the position control of the next servo sector. Note that, for example, when it is determined that the phase of the N burst and the phase of the Q burst of the short servo SSV are inverted by 180° with respect to the reference burst phase and the servo radial position is smaller than the target servo radial position, the correction unit 630 may determine that the servo demodulation position deviates by one track inward in the radial direction and reflect the same to the position control of the next servo sector. For example, when it is determined that the phase of the N burst and the phase of the Q burst of the short servo SSV are inverted by 180° with respect to the reference burst phase and the servo radial position is equal to or greater than the target servo radial position, the correction unit 630 may determine that the servo demodulation position deviates by one track outward in the radial direction and reflect the same to the position control of the next servo sector.

Figure 7:
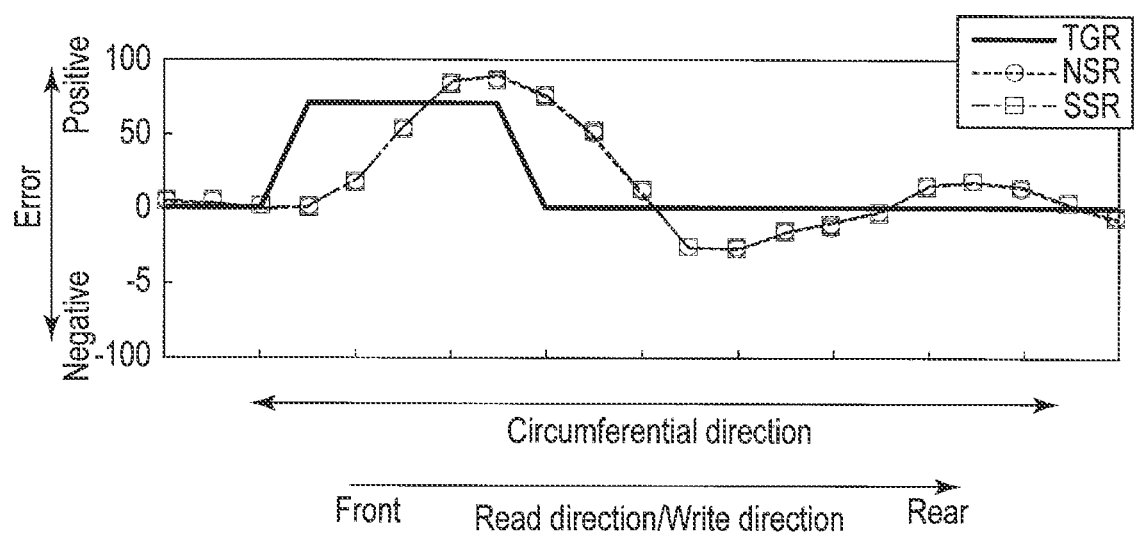
FIG. 7 is a diagram illustrating an example of a path of a servo demodulation position in which the servo demodulation position is corrected in a short servo mode when a head deviates in a radial direction at a particular circumferential position.

FIG. 7 is a diagram illustrating an example of a path of a servo demodulation position in which a servo demodulation position is corrected in a short servo mode when a head 15 deviates in a radial direction at a particular circumferential position. In FIG. 7, a horizontal axis represents a circumferential direction, and a vertical axis represents an error with respect to a target servo radial position. FIG. 7 illustrates a change (hereinafter referred to as a path) TGR in deviation with respect to the target servo radial position at each circumferential position of the servo demodulation position predicted by analysis or the like when the head 15 deviates in the radial direction at the particular circumferential position, a path NSR of the servo demodulation position acquired by demodulating each short servo SSV spaced apart in the circumferential direction in the normal servo mode when the head 15 deviates in the radial direction at the particular circumferential position, and a path SSR of the servo demodulation position (hereinafter referred to as the corrected servo demodulation position) acquired when the correction unit 630 corrects the servo demodulation position acquired by demodulating each short servo SSV spaced apart in the circumferential direction in the short servo mode, as described above, when the head 15 deviates in the radial direction at the particular circumferential position.

As illustrated in FIG. 7, the correction servo demodulation position SSR matches the path NSR of the servo demodulation position. That is, when the correction unit 630 performs correction as described above, it is possible to demodulate the servo demodulation position (radial position) calculated by demodulating each servo region SV of the particular track with the short SG without mistake, and it is possible to match the servo demodulation position calculated by demodulating each servo region SV of the particular track with the normal SG.

The pattern writing unit 640 writes the servo region SV to the disk 10 in the manufacturing process. For example, the pattern writing unit 640 discretely writes the plurality of servo regions SV in the radial direction of the disk 10 at particular intervals in the circumferential direction in the manufacturing process. For example, the pattern writing unit 640 writes the preamble, the servo mark, the gray code, the PAD, the N burst, the Q burst, and the additional pattern in this order to each servo region SV of the particular track in the circumferential direction, and sets each servo region SV of the particular track as the short servo SSV. The pattern writing unit 640 writes the preamble, the servo mark, the gray code, and the PAD in the radial direction. The pattern writing unit 640 writes the N burst in the radial direction after the PAD such that the phase of the N burst is inverted by 180° in one servo track cycle in the radial direction. The pattern writing unit 640 writes the Q burst in the radial direction after the N burst such that the phase of the Q burst is inverted by 180° in one servo track cycle in the radial direction. The pattern writing unit 640 writes the Q burst in the radial direction after the N burst such that the phase of the N burst and the phase of the Q burst deviate by 90° in the radial direction. The pattern writing unit 640 writes the additional pattern in the radial direction after the Q burst such that the phase of the additional pattern become equal in one servo track cycle in the radial direction. At the particular track, the pattern writing unit 640 overwrites the post code on the additional patterns of the short servos SSV in odd multiples among a plurality of servo region SV, for example, all servo regions SV (short servos SSV) sequentially numbered from 1 in the circumferential direction, and sets the short servos SSV in odd multiples among all the short servos SSV sequentially numbered from 1 in the circumferential direction as the normal servos NSV. Note that, at the particular track, the pattern writing unit 640 may overwrite the post codes on the additional patterns of the short servos SSV in even multiples among all the short servos SSV sequentially numbered from 1 in the circumferential direction.

In addition, for example, the pattern writing unit 640 writes the preamble, the servo mark, the gray code, the PAD, the N burst, and the Q burst in this order in the circumferential direction in each servo region SV of the particular track. The pattern writing unit 640 may alternately write the post code and the additional pattern after the Q burst of the entire servo region SV of the particular track. For example, the pattern writing unit 640 writes the post codes after the Q bursts of the servo regions SV in odd multiples among all servo regions SV sequentially numbered from 1 in the circumferential direction, sets the servo regions SV in odd multiples among all servo regions SV sequentially numbered from 1 in the circumferential direction as the normal servo NSV, writes the additional patterns after the Q bursts of the servo regions SV in even multiples among all the servo regions SV sequentially numbered from 1 in the circumferential direction, and sets the servo regions SV in even multiples among all the servo regions SV sequentially numbered from 1 in the circumferential direction as the short servo SSV. Note that the pattern writing unit 640 may write the additional pattern only after the Q burst of the servo region SV to be demodulated in the short servo mode.

Figure 8:
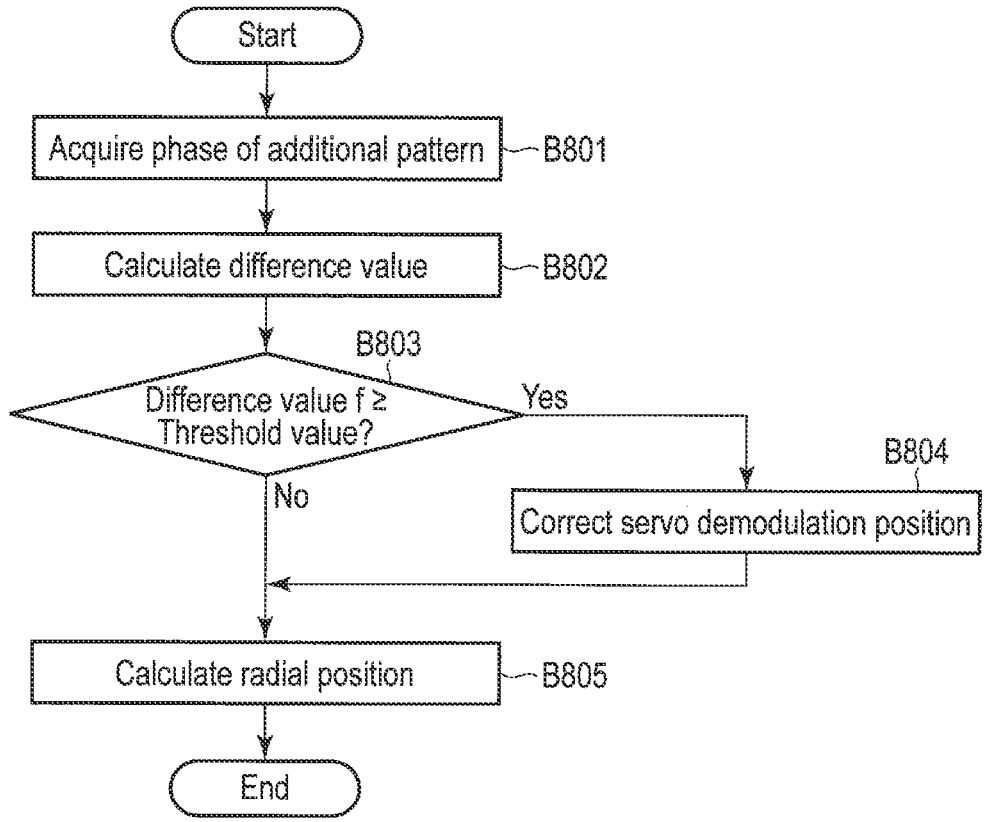
FIG. 8 is a flowchart illustrating an example of a method of correcting a servo demodulation position according to an embodiment.

FIG. 8 is a flowchart illustrating an example of a method of correcting a servo demodulation position according to the present embodiment.

The MPU 60 demodulates the additional pattern to acquire the phase of the additional pattern (B801). The MPU 60 calculates the absolute value of the difference value between the phase of the additional pattern and the phase of the reference additional pattern (the phase of the additional pattern–the phase of the reference additional pattern) (B802). The MPU 60 determines whether the difference value between the phase of the additional pattern and the phase of the reference additional pattern is equal to or larger than the threshold value or smaller than the difference value (B803). When it is determined that the difference value between the phase of the additional pattern and the phase of the reference additional pattern is equal to or larger than the threshold value (Yes in B803), the MPU 60 corrects the servo demodulation position (B804). For example, when it is determined that the difference value between the phase of the additional pattern and the phase of the reference additional pattern is equal to or larger than the threshold value, the MPU 60 corrects the incorrect servo demodulation position to the correct servo demodulation position by correcting the servo demodulation position of the short servo SSV, and proceeds to the process of B805. By using the servo demodulation position corrected in B804 or the servo demodulation position when it is determined that the difference value is smaller than the threshold value (No in B803), the MPU 60 combines the servo demodulation position and the radial position (servo cylinder address) of the servo track to calculate the radial position of the head 15 on the disk 10 (B805), and ends the process.

Figure 9:
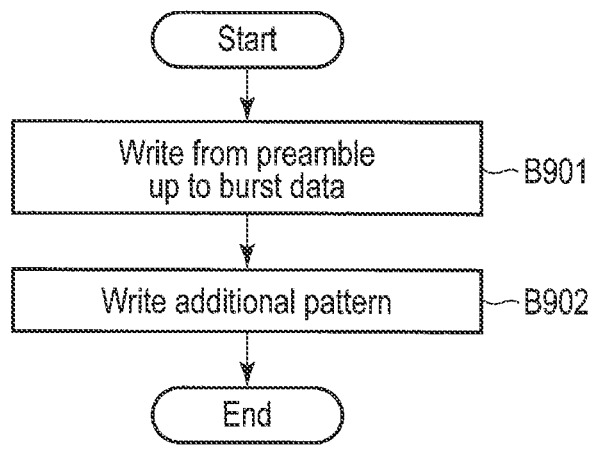
FIG. 9 is a flowchart illustrating an example of a process of writing an additional pattern according to an embodiment.

FIG. 9 is a flowchart illustrating an example of a process of writing an additional pattern according to the present embodiment.

The MPU 60 writes the preamble, the servo mark, the gray code, the N burst, and the Q burst in this order in each servo region SV of the particular track (B901). The MPU 60 writes the additional pattern after the Q burst of each servo region SV (B902), and ends the process. For example, the MPU 60 writes the additional pattern in the radial direction after the Q burst such that the phase of the additional pattern become equal in one servo track cycle in the radial direction. In addition, after writing the additional pattern after the Q burst of each servo region SV, the MPU 60 overwrites the post codes on the additional patterns of the servo regions SV in even multiples among all the servo regions SV sequentially numbered from 1 in the circumferential direction.

Figure 10:
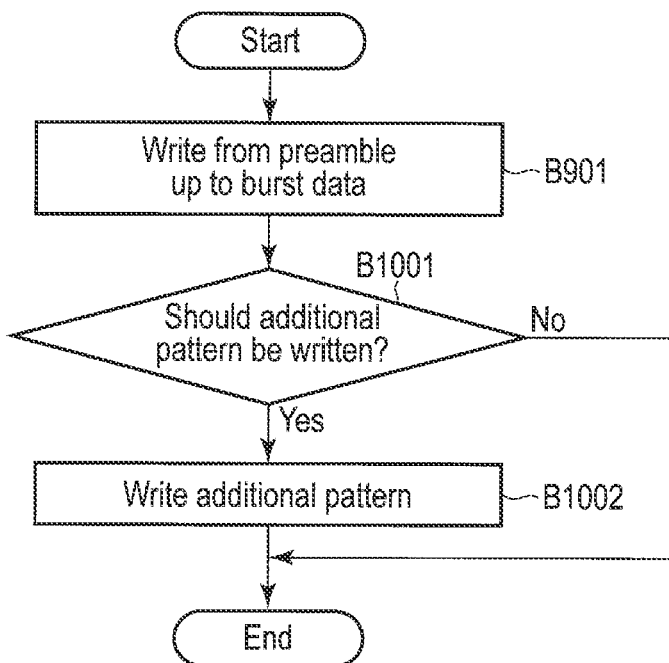
FIG. 10 is a flowchart illustrating an example of a process of writing an additional pattern according to an embodiment.

FIG. 10 is a flowchart illustrating an example of a process of writing an additional pattern according to the present embodiment.

The MPU 60 writes the preamble, the servo mark, the gray code, the N burst, and the Q burst in this order in each servo region SV of the particular track (B901), and determines whether to write the additional pattern after the Q burst (B1001). When it is determined that the additional pattern is not to be written (NO in B1001), the MPU 60 ends the process. When it is determined that the additional pattern is to be written (YES in B1001), the MPU 60 writes the additional pattern after the Q burst (B1002), and ends the process. For example, the MPU 60 writes the additional pattern in the radial direction after the Q burst such that the phase of the additional pattern become equal in one servo track cycle in the radial direction. In addition, the MPU 60 writes the additional patterns of the servo regions SV in even multiples among all the servo regions SV sequentially numbered from 1 in the circumferential direction.

Figure 11:
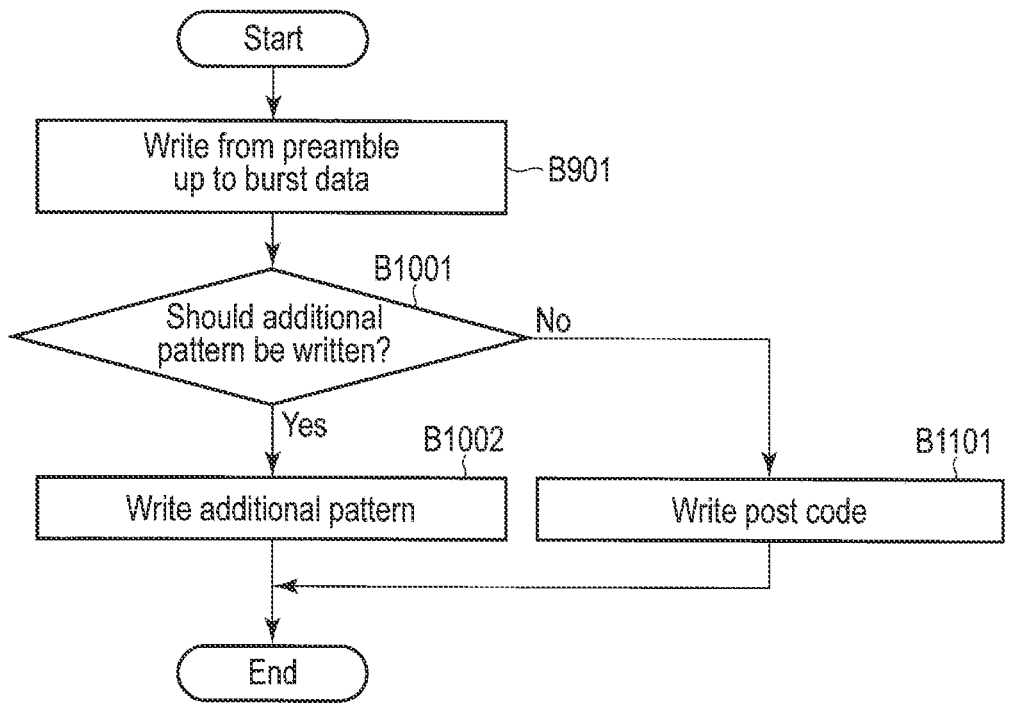
FIG. 11 is a flowchart illustrating an example of a process of writing an additional pattern according to an embodiment.

FIG. 11 is a flowchart illustrating an example of a process of writing an additional pattern according to the present embodiment.

The MPU 60 writes the preamble, the servo mark, the gray code, the N burst, and the Q burst in this order in each servo region SV of the particular track (B901), and determines whether to write the additional pattern after the Q burst (B1001). When it is determined that the additional pattern is not to be written (NO in B1001), the MPU 60 writes the post code after the Q burst (B1101), and ends the process. For example, the MPU 60 writes the post codes of the servo regions SV in odd multiples among all the servo regions SV sequentially numbered from 1 in the circumferential direction, and ends the process. When it is determined that the additional pattern is to be written (Yes in B1001), the MPU 60 writes the additional pattern after the Q burst (B1002), and ends the process. For example, the MPU 60 writes the additional pattern in the radial direction after the Q burst such that the phase of the additional pattern become equal in one servo track cycle in the radial direction. In addition, the MPU 60 writes the additional patterns of the servo regions SV in even multiples among all the servo regions SV sequentially numbered from 1 in the circumferential direction, and ends the process. Note that, after B901 is performed in the servo writing process, it may be determined whether to write the additional pattern of B1001 after proceeding to the next test process.

According to the present embodiment, the magnetic disk device 1 has at least one short servo SSV between two normal servos NSV continuous in the circumferential direction in the particular track. The normal servo NSV includes a preamble, a servo mark, a gray code, a PAD, an N burst, a Q burst, and a post code. The frequency of the post code is equal to the frequency of the preamble. The short servo SSV includes a preamble, a servo mark, a gray code, a PAD, an N burst, a Q burst, and an additional pattern. The frequency of the additional pattern is different from the frequency of the preamble and the frequency of the post code. The additional pattern has the same phase in one servo track cycle in the radial direction of the disk 10. In other words, the phase of the particular additional pattern is equal to the phase of the adjacent additional pattern. The length APL of the additional pattern is shorter than the length PCL of the post code. The magnetic disk device 1 demodulates the normal servo NSV with the normal SG and demodulates the short servo SSV with the short SG. When the short servo is demodulated with the short SG, the magnetic disk device 1 demodulates the additional pattern to acquire the phase of the additional pattern. The magnetic disk device 1 calculates the absolute value of the difference value between the phase of the additional pattern and the phase of the reference additional pattern. When it is determined that the difference value between the phase of the additional pattern and the phase of the reference additional pattern phase is equal to or larger than the threshold value, the magnetic disk device 1 corrects the servo demodulation position of the short servo SSV. Therefore, the magnetic disk device can acquire the correct servo demodulation position (radial position) without using the wrong servo demodulation position (radial position), thereby improving the accuracy of the servo demodulation position. In addition, since the short servo SSV is demodulated with the short SG, data can be written up to immediately before the preamble of the short servo SSV, and the length APL of the additional pattern is shorter than the length PCL of the post code. Therefore, the magnetic disk device 1 can increase the recording area to which user data can be written. Therefore, the magnetic disk device 1 can improve the servo format efficiency.

Next, a magnetic disk device according to a modification will be described. In the modification, the same reference numerals are assigned to the same parts as those of the above-described embodiment, and the detailed description thereof will be omitted.

(Modification 1)

The magnetic disk device 1 of Modification 1 differs from the embodiment described above in the configuration of the short servo SSV.

FIG. 12 is a schematic diagram illustrating an example of the configuration of the short servo SSV according to Modification 1.

When user data is written to two servo regions SV continuous in the circumferential direction, for example, a recording area between the normal servo NSV and the short servo SSV located after the normal servo NSV, the MPU 60 overwrites the user data on part of servo data not read by the short SG among servo data of the short servo SSV. For example, when the user data is written in the recording area between the normal servo NSV and the short servo SSV located after the normal servo NSV, the MPU 60 overwrites the user data on part of the preamble of the short servo SSV. Note that, when the user data is written in the recording area between the normal servo NSV and the short servo SSV located after the normal servo NSV, the MPU 60 may overwrite the user data on the preamble, the servo mark, the gray code, and the PAD of the short servo SSV.

According to Modification 1, when user data is written to a recording area between the normal servo NSV and the short servo SSV located after the normal servo NSV, the magnetic disk device 1 overwrites the user data on part of servo data not read by the short SG among servo data of the short servo SSV. Therefore, the magnetic disk device 1 can improve the servo format efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of correcting a servo demodulation position, which is applied to a magnetic disk device including a disk including two first servo sectors arranged side by side in a circumferential direction and at least a second servo sector located between the two first servo sectors, and a head that writes data to the disk and reads data from the disk, wherein the first servo sector includes burst data and a first data pattern written before the circumferential direction of the burst data, and the second servo sector includes the burst data, the first data pattern written before the circumferential direction of the burst data, and a second data pattern written after the circumferential direction of the burst data, the method comprising:

demodulating the second data pattern to acquire a first phase of the second data pattern;

calculating a difference value between the first phase and a reference phase; and correcting the servo demodulation position demodulated from the second servo sector when an absolute value of the difference value is equal to or larger than a threshold value.

2. The method of correcting a servo demodulation position according to claim 1, wherein a first frequency of the first data pattern is different from a second frequency of the second data pattern, and a first length in the circumferential direction of the first data pattern is different from a second length in the circumferential direction of the second data pattern.

3. The method of correcting a servo demodulation position according to claim 2, wherein the second length is shorter than the first length.

4. The method of correcting a servo demodulation position according to claim 2, wherein the first data pattern comprises a preamble, and the first frequency is equal to a third frequency of the preamble.

5. The method of correcting a servo demodulation position according to claim 4, wherein the second frequency corresponds to ½ of the third frequency and is equal to a fourth frequency of the burst data.

6. The method of correcting a servo demodulation position according to claim 4, wherein the second length is equal to or larger than the sum of the reciprocal of the second frequency and twice the reciprocal of the third frequency.

7. The method of correcting a servo demodulation position according to claim 4, wherein the first data pattern comprises a servo mark written after the preamble and a gray code written after the servo mark.

\* \* \* \* \*